(12) United States Patent
Liu et al.

(10) Patent No.: US 11,249,334 B2
(45) Date of Patent: Feb. 15, 2022

(54) ARRAY SUBSTRATE, DISPLAY PANEL AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xiaona Liu, Beijing (CN); Feng Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/942,900

(22) Filed: Jul. 30, 2020

(65) Prior Publication Data

US 2021/0157188 A1    May 27, 2021

(30) Foreign Application Priority Data

Nov. 22, 2019  (CN) .......................... 201922035224.7

(51) Int. Cl.
*G02F 1/1333* (2006.01)
*G06F 3/041* (2006.01)
*G02F 1/1362* (2006.01)
*G02F 1/1368* (2006.01)

(52) U.S. Cl.
CPC ........ *G02F 1/13338* (2013.01); *G02F 1/1368* (2013.01); *G02F 1/136286* (2013.01); *G06F 3/0412* (2013.01); *G02F 1/136222* (2021.01); *G02F 2201/121* (2013.01); *G02F 2201/123* (2013.01)

(58) Field of Classification Search
CPC .......... G02F 1/13338; G02F 1/136286; G02F 1/1368; G02F 1/136222; G02F 2201/121; G02F 2201/123; G06F 3/0412
See application file for complete search history.

(56) References Cited

U.S. PATENT DOCUMENTS

| | | | | |
|---|---|---|---|---|
| 2017/0192570 A1* | 7/2017 | Choi | ........................ | G06F 3/044 |
| 2018/0095583 A1* | 4/2018 | Kim | .................... | G06F 3/04164 |
| 2018/0314121 A1* | 11/2018 | Fang | ..................... | G02F 1/1368 |
| 2019/0155430 A1* | 5/2019 | Hwang | ............... | G06F 3/04164 |
| 2020/0004365 A1* | 1/2020 | Shin | ...................... | G09G 3/2092 |
| 2020/0333909 A1* | 10/2020 | Chen | ..................... | G06F 3/0416 |
| 2020/0348786 A1* | 11/2020 | Jun | ....................... | G09G 3/3275 |

* cited by examiner

*Primary Examiner* — Ricardo Osorio
(74) *Attorney, Agent, or Firm* — McDermott Will and Emery LLP

(57) ABSTRACT

An array substrate includes first data lines, second data lines, third data lines and first touch electrode lines extend in a second direction, all of which are divided into a plurality of line groups. Each line group includes a first signal line group between first two adjacent sub-pixel areas, and a second signal line group between second two adjacent sub-pixel areas. The first two and second two adjacent sub-pixel areas include three sub-pixel areas adjacent in a first direction intersecting the second direction. The first signal line group includes a first data line and a second data line spaced, and the second signal line group includes a third data line and a first touch electrode line spaced. Each of the first, second and third data lines is closer to a respective one of the three sub-pixel areas relative to other three lines in the line group.

20 Claims, 10 Drawing Sheets

ARRAY SUBSTRATE, DISPLAY PANEL AND DISPLAY DEVICE

CROSS-REFERENCE TO RELATED APPLICATION

This application claims priority to and the benefit of Chinese Patent Application No. 201922035224.7 filed Nov. 22, 2019, which is incorporated herein by reference in its entirety.

TECHNICAL FIELD

The present disclosure relates to the field of display technologies, and in particular, to an array substrate, a display panel and a display device.

BACKGROUND

Touch screens are widely applied to small and medium sized products. The touch screen and the display screen can be combined through in-cell touch technology to realize one-stop seamless production. Touch display products based on this technology, such as touch and display driver integration (TDDI) products, have advantages such as integration, lightness and thinness, low cost, low power consumption, high image quality, and capability of realizing multi-point touch control.

SUMMARY

In an aspect, some embodiments of the present disclosure provide an array substrate. The array substrate has a display area, and the display area includes a plurality of sub-pixel areas. The array substrate includes a first base, first data lines, second data lines, third data liens and first touch electrode lines. The second data lines, the third data liens and the first touch electrode lines are disposed in the display area on the first base, and extend in a second direction. The first data lines, the second data lines, the third data lines and the first touch electrode lines are divided into a plurality of line groups, and each line group includes a first signal line group disposed between first two adjacent sub-pixel areas, and a second signal line group disposed between second two adjacent sub-pixel areas. The first two adjacent sub-pixel areas and the second two adjacent sub-pixel areas include three sub-pixel areas adjacent in a first direction intersecting the second direction. The first signal line group includes a first data line and a second data line that are spaced, and the second signal line group includes a third data line and a first touch electrode line that are spaced. Each of the first data line, the second data line and the third data line in the line group is closer to a respective one of the three sub-pixel areas relative to other three lines in the line group.

In some embodiments, a row of sub-pixel areas arranged in the first direction includes first sub-pixel areas, second sub-pixel areas and third sub-pixel areas, and the first sub-pixel areas, the second sub-pixel areas and the third sub-pixel areas are arranged periodically. The first two adjacent sub-pixel areas include a first sub-pixel area and a second sub-pixel area, the second two adjacent sub-pixel areas include the second sub-pixel area and a third sub-pixel area, and the third data line is disposed at a side of the first touch electrode line proximate to the third sub-pixel area. Or, the first two adjacent sub-pixel areas include the first sub-pixel area and the second sub-pixel area, the second two adjacent sub-pixel areas includes the third sub-pixel area and another first sub-pixel area, and the third data line is disposed at a side of the first touch electrode line proximate to the third sub-pixel area.

In some embodiments, the array substrate further includes a pixel electrode disposed in each sub-pixel area in the row of sub-pixel areas on the first base. The first data line is closer to the first sub-pixel area than the second data line. In the first direction, a first distance between the first data line and a pixel electrode in the first sub-pixel area, a second distance between the second data line and a pixel electrode in the second sub-pixel area, and a third distance between the third data line and a pixel electrode in the third sub-pixel area are approximately equal.

In some embodiments, the second signal line group is disposed between the second sub-pixel area and the third sub-pixel area, a distance between the first touch electrode line and the pixel electrode in the second sub-pixel area in the first direction is a fourth distance, and the fourth distance is greater than or equal to the third distance. Or, the second signal line group is disposed between the third sub-pixel area and the another first sub-pixel area, a distance between the first touch electrode line and a pixel electrode in the another first sub-pixel area in the first direction is a fourth distance, and the fourth distance is greater than or equal to the third distance.

In some embodiments, the third distance is in a range from approximately 3.0 μm to approximately 6.0 μm. The fourth distance is in a range from approximately 3.0 μm to approximately 6.0 μm.

In some embodiments, the array substrate further includes second touch electrode lines that are disposed in the display area on the first base and extend in the second direction. For example, each second touch electrode line is disposed between a first data line and a second data line in a corresponding first signal line group. Or, each second touch electrode line and a corresponding second signal line group are disposed at opposite sides of a third sub-pixel area.

In some embodiments, the array substrate further includes a pixel electrode disposed in each sub-pixel area in the row of sub-pixel areas on the first base. For example, the second touch electrode line is disposed between the first data line and the second data line in the corresponding first signal line group, and in the first direction, a fifth distance between the second touch electrode line and the first data line is approximately equal to a sixth distance between the second touch electrode line and the second data line. Or, the second touch electrode line is disposed between the third sub-pixel area and the another first sub-pixel area, and in the first direction, a seventh distance between the second touch electrode line and the pixel electrode in the third sub-pixel area is approximately equal to an eighth distance between the second touch electrode line and the pixel electrode in the another first sub-pixel area. Or, the second touch electrode line is disposed between the third sub-pixel area and the second sub-pixel area, and in the first direction, the seventh distance between the second touch electrode line and the pixel electrode in the third sub-pixel area is approximately equal to a ninth distance between the second touch electrode line and the pixel electrode in the second sub-pixel area.

In some embodiments, in a case where the second touch electrode line is disposed between the first data line and the second data line in the corresponding first signal line group, the fifth distance is greater than 0 μm, and less than or equal to 10 μm. Or, in a case where the second touch electrode line is disposed between the third sub-pixel area and the another first sub-pixel area, the seventh distance is in a range from approximately 3.0 μm to approximately 6.0 μm. Or, in a case where the second touch electrode line is disposed between the third sub-pixel area and the second sub-pixel area, the seventh distance is in a range from approximately 3.0 µm to approximately 6.0 µm.

In some embodiments, the first data line, the second data line, the third data line, the first touch electrode line and the second touch electrode line are all disposed in a same layer and made of a same material.

In some embodiments, the array substrate further includes a plurality of thin film transistors and a plurality of pixel electrodes, which are disposed in the display area on the first base. Each sub-pixel area in the row of sub-pixel areas is provided with at least one thin film transistor and one pixel electrode. A gate electrode in the at least one thin film transistor is electrically connected to a corresponding gate line, and a drain electrode in the at least one thin film transistor is electrically connected to the pixel electrode. A source electrode in at least one thin film transistor in the first sub-pixel area is electrically connected to a corresponding first data line, a source electrode in at least one thin film transistor in the second sub-pixel area is electrically connected to a corresponding second data line, and a source electrode in at least one thin film transistor in the third sub-pixel area is electrically connected to a corresponding third data line.

In some embodiments, the array substrate further includes a plurality of first transparent conductive patterns. The plurality of first transparent conductive patterns are disposed on surfaces of gate electrodes of all thin film transistors facing the first base, and on surfaces of all gate lines facing the first base, respectively, and the plurality of first transparent conductive retention patterns and the plurality of pixel electrodes are disposed in a same layer and made of a same material.

In some embodiments, the array substrate further includes a plurality of second transparent conductive patterns. The plurality of second transparent conductive retention patterns are disposed on surfaces of source electrodes and drain electrodes of all thin film transistors facing the first base, and on surfaces of all first data lines, all second data lines and all third data lines facing the first base, respectively, and the plurality of second transparent conductive patterns and the plurality of pixel electrodes are disposed in a same layer and made of a same material.

In some embodiments, the substrate further includes a plurality of touch electrodes in the display area on the first base, and the plurality of touch electrodes are insulated from each other. At least one touch electrode is disposed in at least one sub-pixel area. Each first touch electrode line is electrically connected to a touch electrode, and each second touch electrode line is electrically connected to another touch electrode In some embodiments, the plurality of touch electrodes are multiplexed as a common electrode.

In some embodiments, in the first direction, a distance between the first data line and the second data line in the first signal line group is approximately equal to a distance between the third data line and the first touch electrode line in the second signal line group.

In some embodiments, the distance between the third data line and the first touch electrode line in the second signal line group is greater than 0 µm, and less than or equal to 10 µm.

In another aspect, some embodiment of the present disclosure provide a display panel. The display panel includes the array substrate described in any above embodiment.

In some embodiments, the display panel further includes an opposite substrate, and a liquid crystal layer disposed between the array substrate and the opposite substrate.

In some embodiments, in the array substrate, a row of sub-pixel areas arranged in the first direction includes first sub-pixel areas, second sub-pixel areas and third sub-pixel areas, and the first sub-pixel areas, the second sub-pixel areas and the third sub-pixel areas are arranged periodically. The opposite substrate includes a second base and a color film layer disposed at a side of the second base proximate to the array substrate, and the color film layer includes first color filter units, second color filter units and third color filter units. Each first sub-pixel area corresponds to one first color filter unit, each second sub-pixel area corresponds to one second color filter unit, and each third sub-pixel area corresponds to one third color filter unit.

In yet another aspect, some embodiment of the present disclosure provide a display device. The display device includes the display panel described in any above embodiment.

BRIEF DESCRIPTION OF THE DRAWINGS

In order to describe technical solutions in the embodiments of the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, accompanying drawings in the following description may be regarded as schematic diagrams, and are not limitations on an actual size of a product, an actual process of a method and an actual timing of signals involved in the embodiments of the present disclosure.

DETAILED DESCRIPTION

Technical solutions in some embodiments of the present disclosure will be described clearly and completely in combination with accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification, the term "comprise" and other forms thereof such as the third-person singular form "comprises" and the present participle form "comprising" are construed as open and inclusive, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or the example(s) are included in at least one embodiment or example of the present disclosure. Schematic representations of the above terms do not necessarily refer to the same embodiment(s) or example(s). In addition, the specific features, structures, materials or characteristics may be included in any or more embodiments/examples in any suitable manner.

Terms such as "first" and "second" are only used for descriptive purposes, and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a plurality of" means two or more unless otherwise specified.

In the description of some embodiments, terms such as "connected" and its extensions may be used. For example, term "connected" may be used in the description of some embodiments to indicate that two or more components are in direct physical or electrical contact with each other, or indirect physical or electrical connection. The embodiments disclosed herein are not necessarily limited to the contents herein.

The term "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "approximately" can mean within one or more standard deviations, or within ±30%, 20%, 10% or 5% of the stated value.

It will also be understood that when a layer or element is referred to as being "on" another layer or substrate, it can be directly on the another layer or substrate, or intervening layers may also be present.

Figure 12:
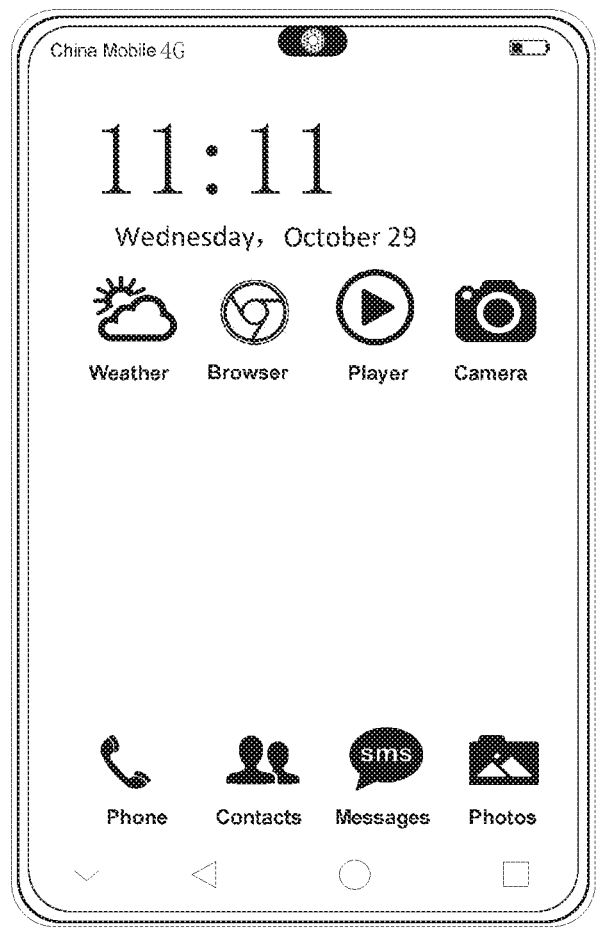
FIG. 12 is a schematic diagram of a display device, in accordance with some embodiments.

As shown in FIG. 12, some embodiments of the present disclosure provide a display device 100, such as a television, a mobile phone, a tablet computer, a personal digital assistant (FDA), or a vehicle-mounted computer.

The display device 100 includes a display panel. The display panel includes a plurality of sub-pixels, and the plurality of sub-pixels include sub-pixels of a first color, sub-pixels of a second color, and sub-pixels of a third color. The first color, the second color, and the third color are three primary colors (e.g., red, green and blue, respectively). The sub-pixels of the first color, the sub-pixels of the second color, and the sub-pixels of the third color are configured to emit light of the three primary colors.

Figure 1:
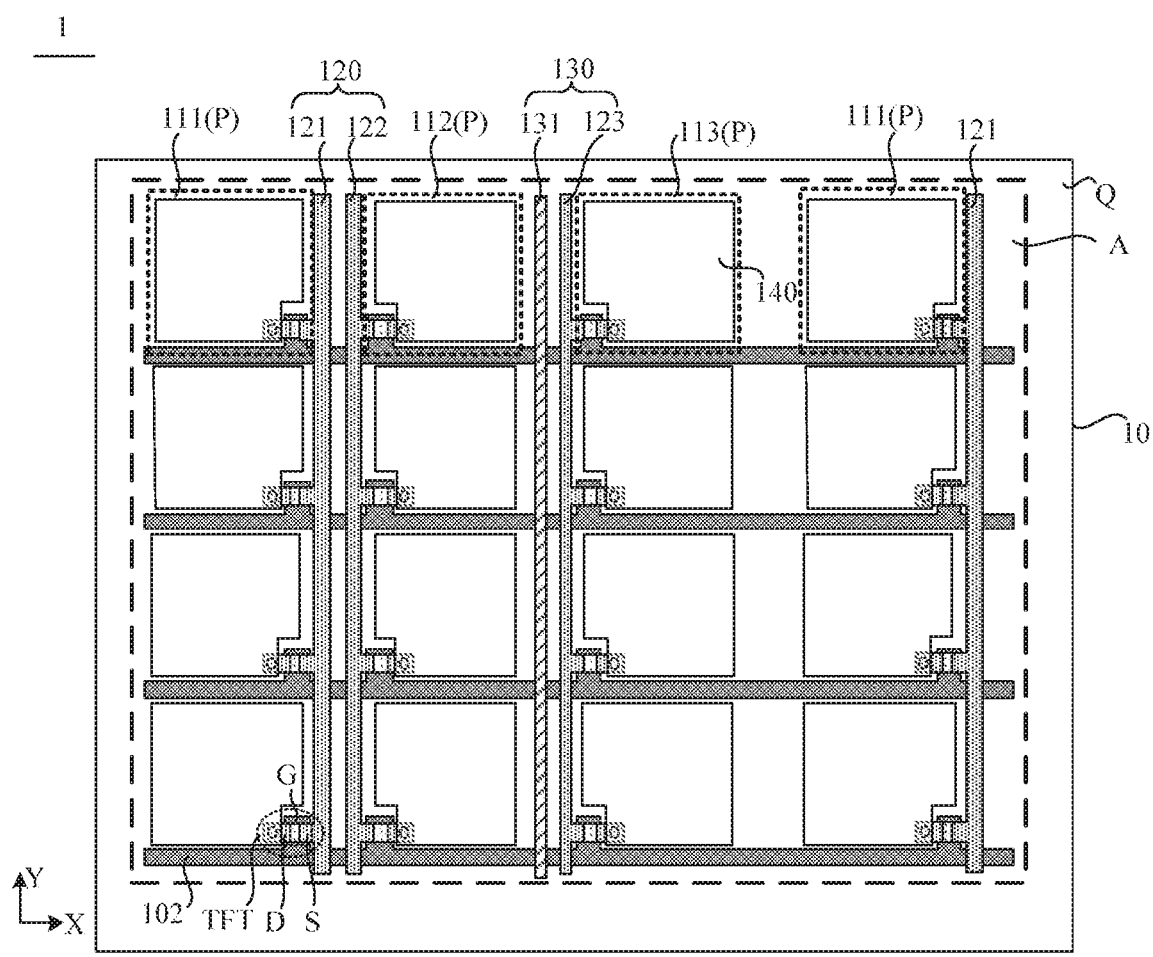
FIG. 1 is a structural diagram of an array substrate, in accordance with some embodiments.
Figure 2:
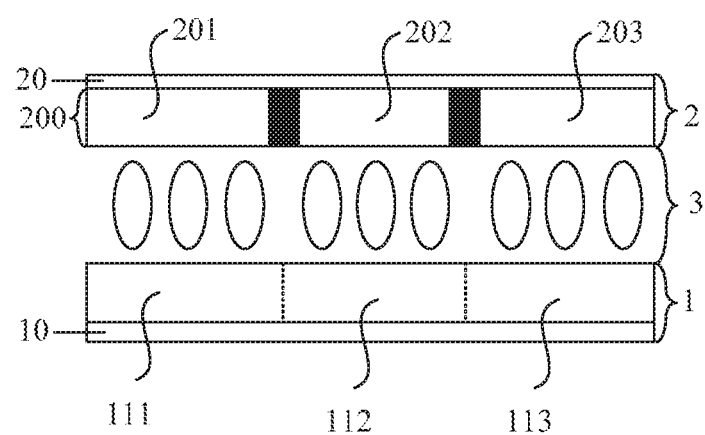
FIG. 2 is a structural diagram of a display panel, in accordance with some embodiments.

As shown in FIG. 2, the display panel includes an array substrate 1. In some embodiments, as shown in FIG. 1, the array substrate 1 has a display area A and a peripheral area Q. The peripheral area Q is disposed around the display area A, for example. The display area A includes a plurality of sub-pixel areas P in one-to-one correspondence with the plurality of sub-pixels.

Figure 3:
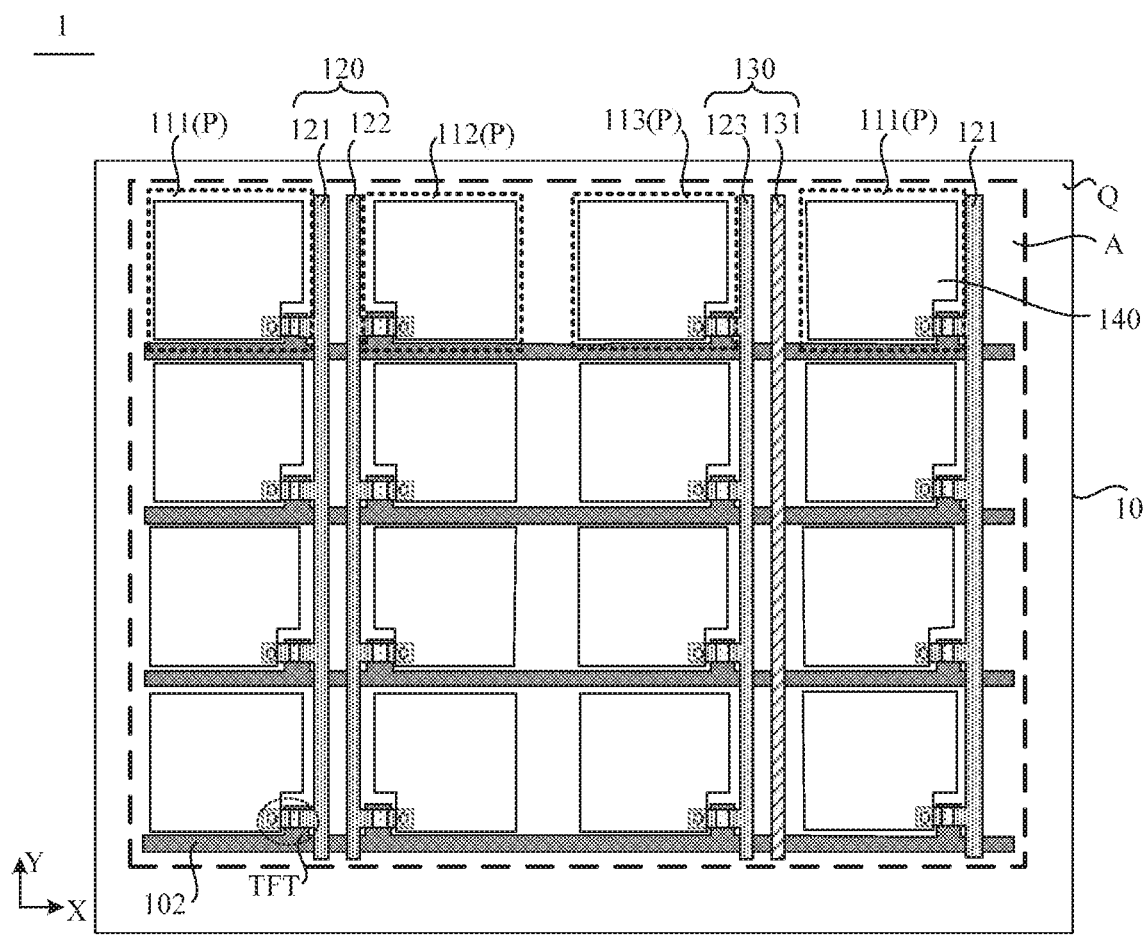
FIG. 3 is a structural diagram of another array substrate, in accordance with some embodiments.

As shown in FIGS. 1 and 3, the array substrate 1 includes a first base 10, a plurality of data lines in the display area A on the first base 10, and a plurality of touch electrode lines in the display area A on the first base 10. The plurality of data lines all extend in a second direction Y, and the plurality of touch electrode lines all extend in the second direction Y. The plurality of data lines include first data lines 121, second data lines 122, and third data lines 123. The plurality of touch electrode lines includes first touch electrode lines 131.

For convenience of description, FIGS. 1 and 3 each show only two first data lines 121, one second data line 122, one third data line 123 and one first touch electrode line 131, but in practice, there are a plurality of first data lines 121, a plurality of second data lines 122, a plurality of third data lines 123 and a plurality of first touch electrode lines 131. The number of the first data lines 121, the number of the second data lines 122, the number of the third data lines 123 and the number of the first touch electrode lines 131 may be set as needed.

As shown in FIGS. 1 and 3, the first data lines 121, the second data lines 122, the third data lines 123 and the first touch electrode lines 131 are divided into a plurality of line groups. Each line group includes a first signal line group 120 disposed between first two adjacent sub-pixel areas, and a second signal line group 130 disposed between second two adjacent sub-pixel areas. The first two adjacent sub-pixel areas and the second two adjacent sub-pixel areas include three sub-pixel areas P adjacent in a first direction X intersecting the second direction Y. For example, the first direction X is perpendicular to the second direction Y.

The first signal line group 120 includes or is composed of a first data line 121 and a second data line 122 that are spaced, and the second signal line group 130 includes or is composed of a third data line 123 and a first touch electrode line 131 that are spaced. Each of the first data line 121, the second data line 122 and the third data line 123 in the line group is closer to a respective one of the three sub-pixel areas P relative to the other three lines in the line group.

Since the first data line 121 and the second data line 122 are disposed between the first two adjacent sub-pixel areas P, the first data line 121 is closer to one of the first two adjacent sub-pixel areas P relative to the other three lines in the line group, and the second data line 122 is closer to the other of the first two adjacent sub-pixel areas P relative to the other three lines in the line group. As for the third data line 123 and the first touch electrode line 131, the third data line 123 is closer to the remaining one of the three adjacent sub-pixel areas other than the first two adjacent sub-pixel areas P relative to the first touch electrode line 131.

In some embodiments, as shown in FIGS. 1 and 3, a row of sub-pixel areas P arranged in the first direction X includes first sub-pixel areas 111, second sub-pixel areas 112 and third sub-pixel areas 113. For example, each row of sub-pixel areas P includes the first sub-pixel areas 111, the second sub-pixel areas 112 and the third sub-pixel areas 113. For example, the first sub-pixel areas 111 are in one-to-one correspondence with the sub-pixels of the first color, the second sub-pixel areas 112 are in one-to-one correspondence with the sub-pixels of the second color, and the third sub-pixel areas 113 are in one-to-one correspondence with the sub-pixels of the third color.

As shown in FIGS. 1 and 3, in the row of sub-pixel areas P arranged in the first direction X, the first sub-pixel area 111, the second sub-pixel area 112 and the third sub-pixel area 113 are arranged sequentially and periodically. For example, each row of sub-pixel areas P arranged in the first direction X includes a plurality of repeating units, and each repeating unit includes the first sub-pixel area 111, the second sub-pixel area 112, and the third sub-pixel area 113 sequentially arranged in the first direction X.

For example, the plurality of sub-pixel areas P are arranged in an array. In the first direction X, a column of first sub-pixel areas 111, a column of second sub-pixel areas 112, and a column of third sub-pixel areas 113 are arranged sequentially and periodically. In this case, a row of sub-pixel areas P (e.g., a row of sub-pixel areas P arranged in the first direction X in FIG. 1) corresponds to a gate line 102, and a column of sub-pixel areas P (e.g., a column of sub-pixel areas P arranged in the second direction Y in FIG. 1) corresponds to a data line.

In some examples, as shown in FIG. 1, the first two adjacent sub-pixel areas include a first sub-pixel area 111 and a second sub-pixel area 112. That is, the first signal line group 120 is disposed between the first sub-pixel area 111 and the second sub-pixel area 112. The first data line 121 and the second data line 122 in the first signal line group 120 are configured to supply data signals to a pixel electrode in the first sub-pixel area 111 and a pixel electrode in the second sub-pixel area 112, respectively.

As for an arrangement position of the second signal line group 130, there are the following two possible implementations.

In a first possible implementation, as shown in FIG. 1, the second two adjacent sub-pixel areas include the second sub-pixel area 112 and a third sub-pixel area 113 adjacent thereto. That is, the second signal line group 130 is disposed between the second sub-pixel area 112 and the third sub-pixel area 113. The third data line 123 in the second signal line group 130 is disposed at a side of the first touch electrode line 131 proximate to the third sub-pixel area 113.

In a second possible implementation, as shown in FIG. 3, the second two adjacent sub-pixel areas include the third sub-pixel area 113 and another first sub-pixel area 111 adjacent to the third sub-pixel area 113. That is, the second signal line group 130 is disposed between the third sub-pixel area 113 and the another first sub-pixel area 111. The third data line 123 in the second signal line group 130 is disposed at a side of the first touch electrode line 131 proximate to the third sub-pixel area 113. The third data line 123 is configured to supply a data signal to a pixel electrode in the third sub-pixel area 113.

Figure 4:
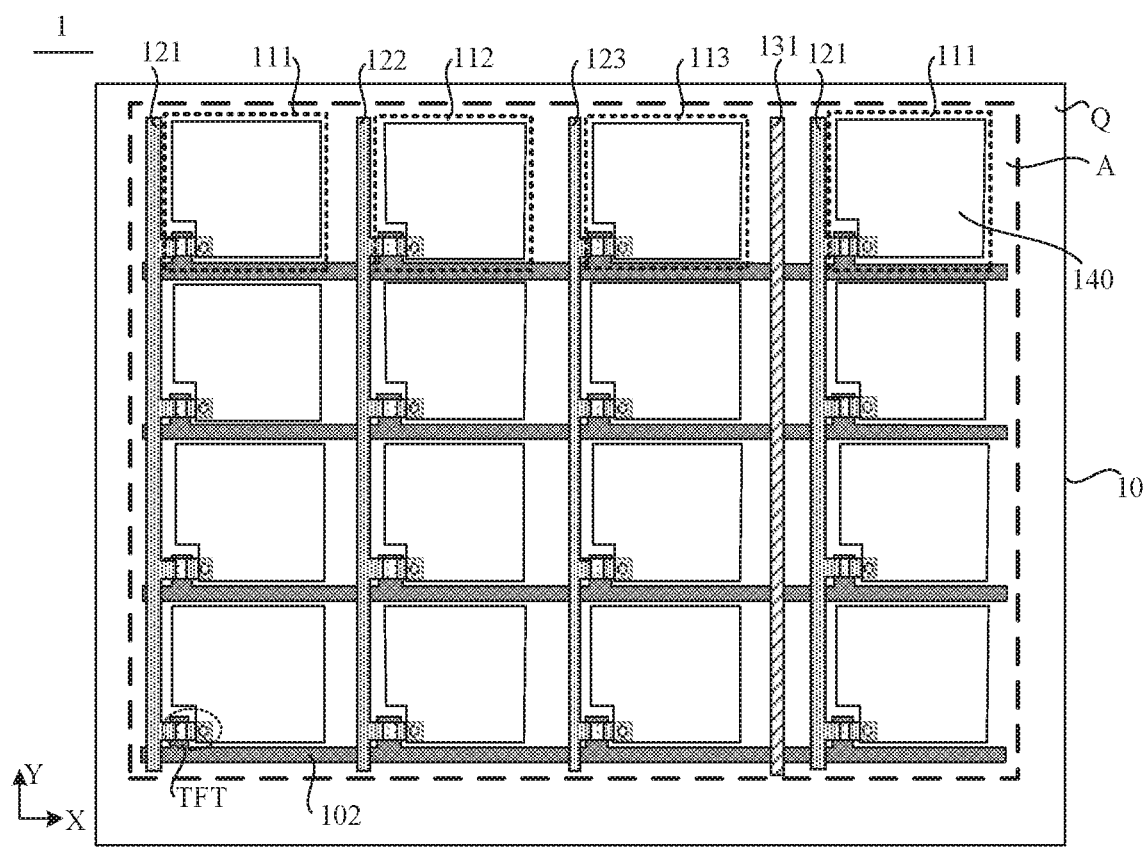
FIG. 4 is a structural diagram of an array substrate in the related art.

In the related art, each data line is disposed at a same side of a corresponding sub-pixel area P. For example, as shown in FIG. 4, in the array substrate 1, each first data line 121 is disposed at the left side of a corresponding first sub-pixel area 111 (i.e., in the first direction X, the first data line 121 is disposed at a side of the corresponding first sub-pixel area 111 away from the second sub-pixel area 112 adjacent thereto), each second data line 122 is disposed at the left side of a corresponding second sub-pixel area 112 (i.e., in the first direction X, the second data line 122 is disposed at a side of the corresponding second sub-pixel area 112 proximate to the first sub-pixel area 111 adjacent thereto), and the third data line 123 is disposed at the left side of a corresponding third sub-pixel area 113 (i.e., in the first direction X, the third data line 123 is disposed at a side of the corresponding third sub-pixel area 113 proximate to the second sub-pixel area 112 adjacent thereto). Each first touch electrode line 131 is disposed at the right side of a corresponding third sub-pixel area 113 (i.e., in the first direction X, the first touch electrode line 131 is disposed at a side of the corresponding third sub-pixel area 113 proximate to another first sub-pixel area 111 adjacent thereto), and the first touch electrode line 131 is disposed at a side of the adjacent first data line 121 proximate to the third sub-pixel area 113.

In this case, the first data line 121 and the second data line 122 are respectively provided at the left and right sides of the first sub-pixel area 111, and a difference between coupling capacitances existing between the pixel electrode in the first sub-pixel area 111 and the data lines (the first data line 121 and the second data line 122) at two sides thereof is small. The second data line 122 and the third data line 123 are respectively provided at the left and right sides of the second sub-pixel area 112, and a difference between coupling capacitances existing between the pixel electrode in the second sub-pixel area 112 and the data lines (the second data line 122 and the third data line 123) at two sides thereof is also small. The third data line 123 is provided at the left side of the third sub-pixel area 113, and the first touch electrode line 131 and another first data line 121 are provided at the right side of the third sub-pixel area 113. In the first direction X, a distance between the first data line 121 and the third sub-pixel area 113 is greater than a distance between the third data line 123 and the third sub-pixel area 113, and thus a coupling capacitance between the pixel electrode in the third sub-pixel area 113 and the third data line 123 is greater than a coupling capacitance between the pixel electrode in the third sub-pixel area 113 and the first data line 121. That is, a difference between coupling capacitances at two sides of the third sub-pixel area 113 is large.

In a process of switching image frames, a polarity of a data signal on each data line is switched, which results in a large voltage change. Due to existence of coupling capacitances, a switching of a data signal on each data line causes a voltage on a pixel electrode in a sub-pixel area P forming a coupling capacitance with the data line to jump. That is, the switching of the data signal on the data line has a pulling effect on a potential of the pixel electrode in the sub-pixel area P. In the related art, an extent to which a data signal on the first data line 121 pulls a potential of the pixel electrode in the first sub-pixel area 111 is approximately the same as an extent to which a data signal on the second data line 122 pulls the potential of the pixel electrode in the first sub-pixel area 111; an extent to which a data signal on the second data line 122 pulls a potential of the pixel electrode in the second sub-pixel area 112 is approximately the same as an extent to which a data signal on the third data line 123 pulls the potential of the pixel electrode in the second sub-pixel area 112. As a result, a degree of potential change of the pixel electrode in the first sub-pixel area 111 is approximately the same as a degree of potential change of the pixel electrode in the second sub-pixel area 112 in the process of switching image frame. However, an extent to which the data signal on the third data line 123 pulls a potential of the pixel electrode in the third sub-pixel area 113 is greater than an extent to which the data signal on the another first data line 121 adjacent to the third sub-pixel area 113 pulls the potential of the pixel electrode in the third sub-pixel area 113. As a result, in the process of switching image frame, a degree of potential change of the pixel electrode in the third sub-pixel area 113 is different from the degree of potential change of the pixel electrode in the first sub-pixel area 111 and the degree of potential change of the pixel electrode in the second sub-pixel area 112. Therefore, in a case where an image is displayed, potential changes of the pixel electrodes corresponding to the first sub-pixel area 111, the second sub-pixel area 112, and the third sub-pixel area 113 are inconsistent, thereby causing brightness of a sub-pixel of the first color and brightness of a sub-pixel of the second color are different from brightness of a sub-pixel of the third color, which makes a color of the displayed image abnormal. For example, in a case where the sub-pixel of the third color is a blue sub-pixel and the display panel displays a white image, blue or yellow may occur. In particular, in an area of the image corresponding to a first row of sub-pixels (i.e., a row of sub-pixels scanned first) of the display panel, blue or yellow may occur and a Mura phenomenon may occur.

However, in some embodiments of the present disclosure, taking the structure of the array substrate 1 shown in FIG. 1 as an example, the first data line 121 is provided at the right side of the first sub-pixel area 111, the pixel electrode in the first sub-pixel area 111 forms a coupling capacitor with the data line only at one side of the pixel electrode, and coupling capacitances at the left and right sides of the first sub-pixel area 111 are different. The second data line 122 is provided at the left side of the second sub-pixel area 112, the first touch electrode line 131 is provided at the right side of the second sub-pixel area 112, the pixel electrode in the second sub-pixel area 112 forms a coupling capacitor with the data line only at one side of the pixel electrode, and coupling capacitances at the left and right sides of the second sub-pixel area 112 are different. The third data line 123 is provided at the left side of the third sub-pixel area 113, the pixel electrode in the third sub-pixel area 113 forms a coupling capacitor with the data line only at one side of the pixel electrode, and coupling capacitances at the left and right sides of the third sub-pixel area 113 are different.

Or, the structure of the array substrate 1 shown in FIG. 3 is taken as an example. The first data line 121 is provided at the right side of the first sub-pixel area 111 (on the right in FIG. 3), the first touch electrode line 131 is provided at the left side of the first sub-pixel area 111. The pixel electrode in the first sub-pixel area 111 forms a coupling capacitor with the data line only at the right side of the first sub-pixel area 111, and coupling capacitances at the left and right sides of the first sub-pixel area 111 are different. The second data line 122 is provided at the left side of the second sub-pixel area 112, the pixel electrode in the second sub-pixel area 112 forms a coupling capacitor with the data line only at the left side of the second sub-pixel area 112, and coupling capacitances at the left and right sides of the second sub-pixel area 112 are different. The third data line 123 is provided at the right side of the third sub-pixel area 113, the pixel electrode in the third sub-pixel area 113 forms a coupling capacitor with the data line only at the right side of the third sub-pixel area 113, and coupling capacitances at the left and right sides of the third sub-pixel area 113 are different.

Therefore, in the process of switching image frames, the degree of potential change of the pixel electrode in the first sub-pixel area 111 caused by a pulling of the potential of the pixel electrode in the first sub-pixel area 111 by the data signal on the first data line 121, the degree of potential change of the pixel electrode in the second sub-pixel area 112 caused by a pulling of the potential of the pixel electrode in the second sub-pixel area 112 by the data signal on the second data line 122, and the degree of potential change of the pixel electrode in the third sub-pixel area 113 caused by a pulling of the potential of the pixel electrode in the third sub-pixel area 113 by the data signal on the third data line 123 are approximately the same. Therefore, it may avoid that, when an image is displayed, potential changes of pixel electrodes corresponding to the first sub-pixel area 111, the second sub-pixel area 112 and the third sub-pixel area 113 are inconsistent, thereby causing brightness of the sub-pixel of the first color and brightness of the sub-pixel of the second color are different from brightness of the sub-pixel of the third color.

In a case where the second signal line group 130 is disposed between the second sub-pixel area 112 and the third sub-pixel area 113 adjacent thereto, since a distance between the third data line 123 and the second sub-pixel area 112 is greater than a distance between the second data line 122 and the second sub-pixel area 112, the pulling of the potential of the pixel electrode in the second sub-pixel area 112 by the data signal on the third data line 123 may be ignored. In a case where the second signal line group 130 is disposed between the third sub-pixel area 113 and the another first sub-pixel area 111 adjacent thereto, since a distance between the third data line 123 and the another first sub-pixel area 111 is greater than a distance between another first data line 121 and the another first sub-pixel area 111, the pulling of the potential of the pixel electrode in the first sub-pixel area 111 by the data signal on the third data line 123 may be ignored.

Figure 5:
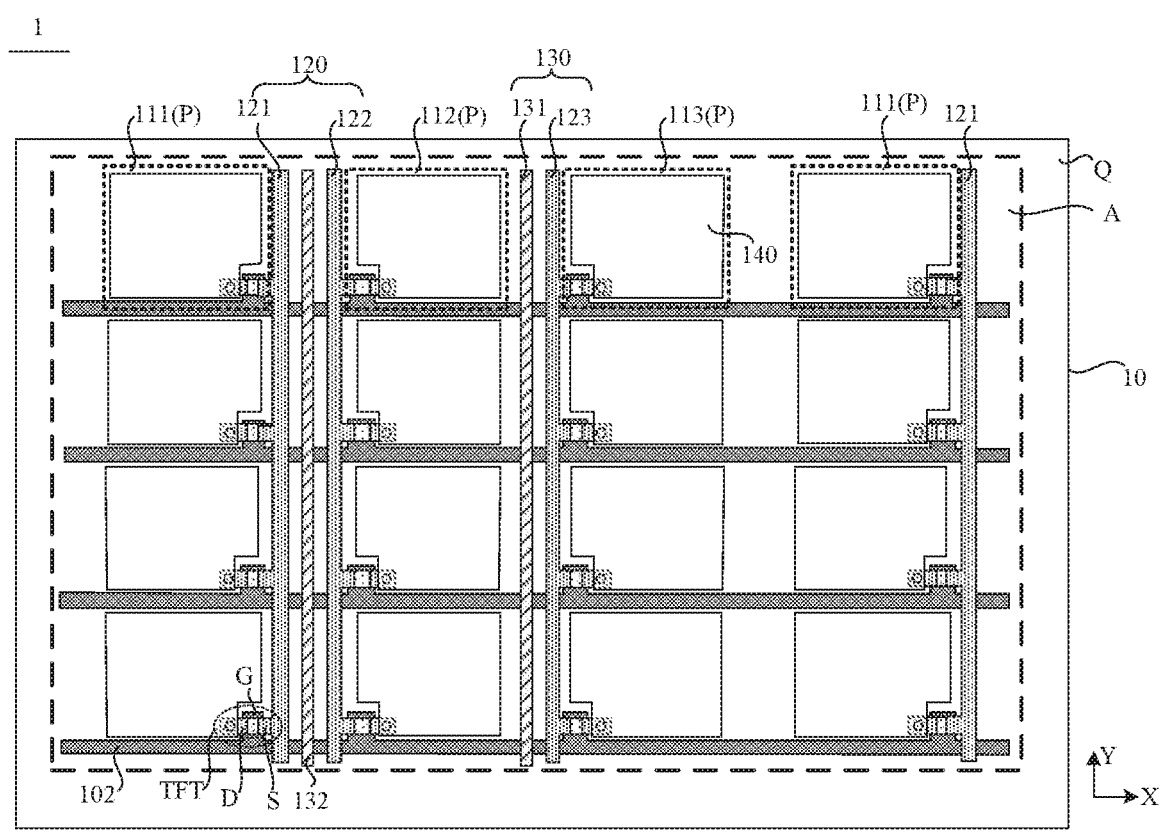
FIG. 5 is a structural diagram of yet another array substrate, in accordance with some embodiments.
Figure 6:
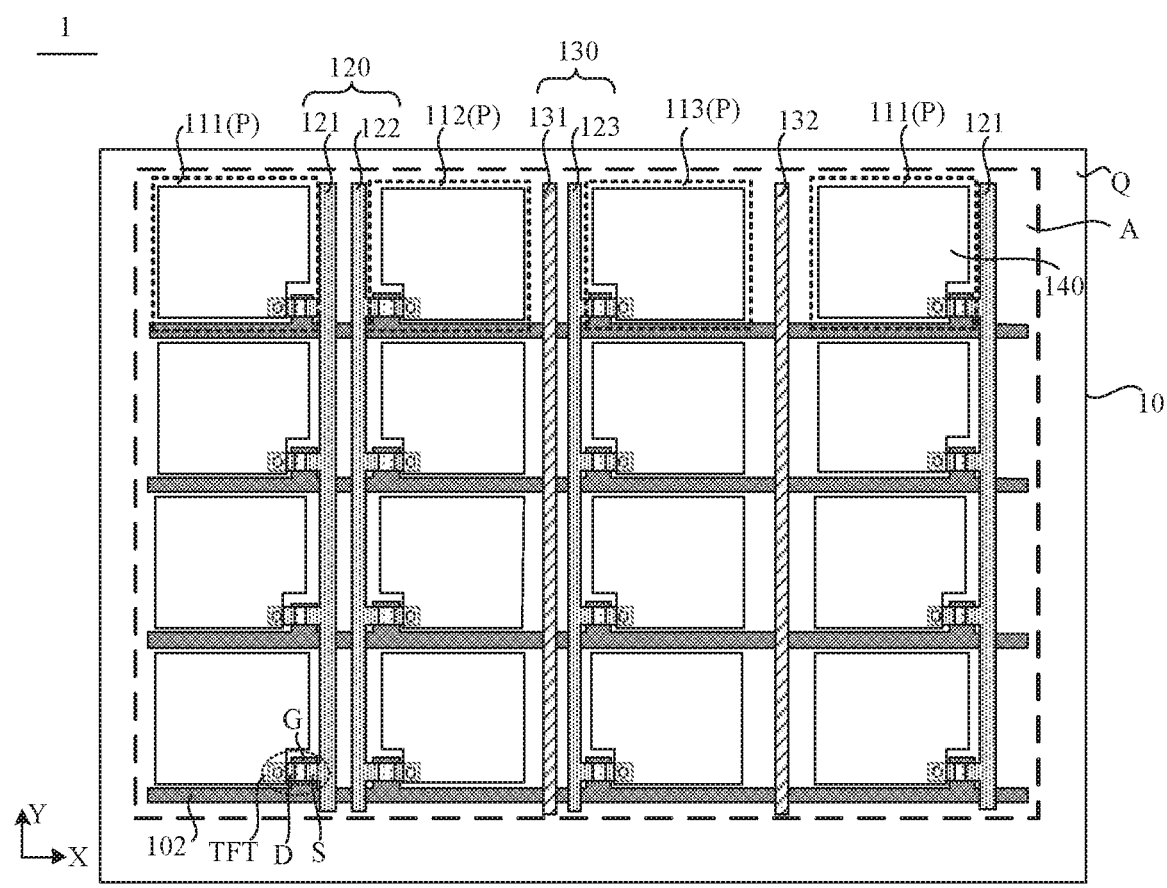
FIG. 6 is a structural diagram of yet another array substrate, in accordance with some embodiments.
Figure 7:
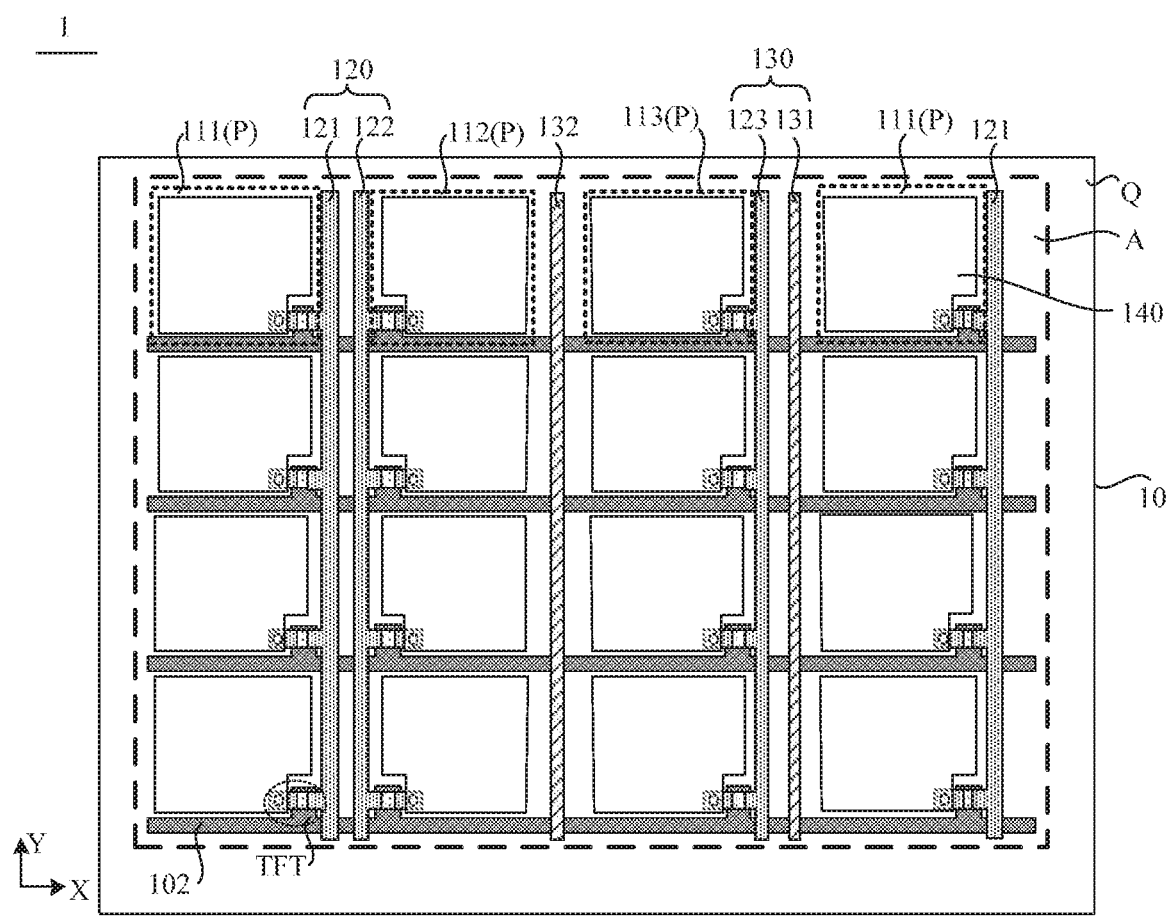
FIG. 7 is a structural diagram of yet another array substrate, in accordance with some embodiments.

In some embodiments, as shown in FIGS. 5, 6, and 7, the plurality of touch electrode lines further include second touch electrode lines 132. The second touch electrode lines 132 extend in the second direction Y. FIGS. 5, 6 and 7 only show one second touch electrode line 132, but in practice, the number of second touch electrode lines 132 is more than one. The number of second touch electrode lines 132 may be set according to actual needs.

In some examples, as shown in FIG. 5, each second touch electrode line 132 is disposed between a first data line 121 and a second data line 122 in a corresponding first signal line group 120.

In some other examples, as shown in FIGS. 6 and 7, each second touch electrode line 132 and a corresponding second signal line group 130 are disposed at opposite sides of a third sub-pixel area 113.

For example, as shown in FIG. 6, the second signal line group 130 is disposed between the second sub-pixel area 112 and the third sub-pixel area 113 adjacent thereto, and the second touch electrode line 132 is disposed between the third sub-pixel area 113 and the another first sub-pixel area 111 adjacent thereto.

That is, in the first direction X, the second signal line group 130 is disposed at the left side of the third sub-pixel area 113, and the second touch electrode line 132 is disposed at the right side of the third sub-pixel area 113.

In a case where a sub-pixel area P at a first position in each row in the first direction X is the first sub-pixel area 111, a second touch electrode line 132 may be provided at a side of the first sub-pixel area 111 away from the second sub-pixel area 112.

For another example, as shown in FIG. 7, the second signal line group 130 is disposed between the third sub-pixel area 113 and the another first sub-pixel area 113 adjacent thereto, and the second touch electrode line 132 is disposed between the third sub-pixel area 113 and the second sub-pixel area 112.

That is, in the first direction X, the second signal line group 130 is disposed at the right side of the third sub-pixel area 113, and the second touch electrode line 132 is disposed at the left side of the third sub-pixel area 113.

In a case where the array substrate 1 includes the second touch electrode lines 132, the second touch electrode lines 132 do not affect the coupling capacitance of a pixel electrode in each sub-pixel area P and a corresponding data line. Based on this, the coupling capacitances at the left and right sides of the first sub-pixel area 111 are different, the coupling capacitances at the left and right sides of the second sub-pixel area 112 are different, and the coupling capacitances at the left and right sides of the third sub-pixel area 113 are different. In the process of switching image frames, the degree of potential change of the pixel electrode in the first sub-pixel area 111 caused by a pulling of the potential of the pixel electrode in the first sub-pixel area 111 by the data signal on the first data line 121, the degree of potential change of the pixel electrode in the second sub-pixel area 112 caused by a pulling of the potential of the pixel electrode in the second sub-pixel area 112 by the data signal on the second data line 122, and the degree of potential change of the pixel electrode in the third sub-pixel area 113 caused by a pulling of the potential of the pixel electrode in the third sub-pixel area 113 by the data signal on the third data line 123 are approximately the same.

In some embodiments, as shown in FIG. 1, the array substrate 1 further includes a plurality of pixel electrodes 140 on the first base 10. Each sub-pixel area P of a row of sub-pixel areas P is provided with one pixel electrode 140. For example, each sub-pixel area P of all rows of sub-pixel areas P is provided with one pixel electrode 140.

As shown in FIGS. 1 and 3, in the first data line group 120, the first data line 121 is closer to the first sub-pixel area 111 than the second data line 122. In the first direction X, a distance (referred to as a first distance) between the first data line 121 and the pixel electrode 140 in the first sub-pixel area 111, a distance (referred to as a second distance) between the second data line 122 and the pixel electrode 140 in the second sub-pixel area 112, and a distance (referred to as a third distance) between the third data line 123 in the second data line group 130 and the pixel electrode 140 in the third sub-pixel area 113 are approximately equal.

The distance herein and hereinafter refers to a minimum distance between two adjacent sides of two adjacent objects in the first direction X. For example, as shown in FIG. 1, the distance between the first data line 121 and the pixel electrode 140 in the first sub-pixel area 111 refers to a minimum distance between a side of the first data line 121 proximate to this pixel electrode 140 and a side of this pixel electrode 140 facing and closer to the first data line 121 in the first direction X. For example, this pixel electrode 140 has two sides facing the first data line 121, and the "side of this pixel electrode 140" refers to one of the two sides closer to the first data line 121.

In this way, a coupling capacitance existing between the first data line 121 and the pixel electrode 140 in the first sub-pixel area 111, a coupling capacitance existing between the second data line 122 and the pixel electrode 140 in the second sub-pixel area 112, and a coupling capacitance existing between the third data line 123 and the pixel electrode 140 in the third sub-pixel area 113 are approximately equal.

On this basis, in the process of switching image frames, the degree of potential change of the pixel electrode 140 in the first sub-pixel area 111 caused by a pulling of the potential of the pixel electrode 140 in the first sub-pixel area 111 by the data signal on the first data line 121, the degree of potential change of the pixel electrode 140 in the second sub-pixel area 112 caused by a pulling of the potential of the pixel electrode 140 in the second sub-pixel area 112 by the data signal on the second data line 122, and the degree of potential change of the pixel electrode 140 in the third sub-pixel area 113 caused by a pulling of the potential of the pixel electrode 140 in the third sub-pixel area 113 by the data signal on the third data line 123 are approximately the same. For example, a degree of decrease in the potential of the pixel electrode 140 in the first sub-pixel area 111, a degree of decrease in the potential of the pixel electrode 140 in the second sub-pixel area 112, and a degree of decrease in the potential of the pixel electrode 140 in the third sub-pixel area 113 are approximately the same. Therefore, it may avoid that, in a case where an image is displayed, potential changes of pixel electrodes corresponding to the first sub-pixel area 111, the second sub-pixel area 112 and the third sub-pixel area 113 are inconsistent, which may cause brightness of the sub-pixel of the first color and brightness of the sub-pixel of the second color to be different from brightness of the sub-pixel of the third color, which makes a color of the displayed image abnormal. For example, it may avoid that, a voltage difference between the pixel electrode 140 in the first sub-pixel area 111 and a common electrode, a voltage difference between the pixel electrode 140 in the second sub-pixel area 112 and the common electrode, and a voltage difference between the pixel electrode 140 in the third sub-pixel area 113 and the common electrode are different.

In some embodiments, as shown in FIG. 1, the second signal line group 130 is disposed between the second sub-pixel area 112 and the third sub-pixel area 113 adjacent thereto. A distance between the first touch electrode line 131 in the second signal line group 130 and the pixel electrode 140 in the second sub-pixel area 112 in the first direction X is a fourth distance, and the fourth distance is greater than or equal to the third distance. In some other embodiments, as shown in FIG. 3, the second signal line group 130 is disposed between the third sub-pixel area 113 and the another first sub-pixel area 111 adjacent thereto. A distance between the first touch electrode line 131 in the second signal line group 130 and the pixel electrode 140 in the another first sub-pixel area 111 in the first direction X is a fourth distance, and the fourth distance is greater than or equal to the third distance.

In some embodiments, the third distance is in a range from approximately 3.0 μm to approximately 6.0 μm. For example, the third distance is 3.0 μm, 3.5 μm, 4.0 μm, 4.5 μm, 5.0 μm, 5.5 μm, or 6.0 μm.

In some examples, the third distance is in a range from approximately 4.5 μm to approximately 5.0 μm.

In some embodiments, the fourth distance is in a range from approximately 3.0 μm to approximately 6.0 μm. For example, the fourth distance is 3.0 μm, 3.5 μm, 4.0 μm, 4.5 μm, 5.0 μm, 5.5 μm, or 6.0 μm.

In some embodiments, as shown in FIG. 5, the second touch electrode line 132 is disposed between the first data line 121 and the second data line 122 in a corresponding first signal line group 120, and in the first direction X, a distance (referred to as a fifth distance) between the second touch electrode line 132 and the first data line 121 is equal to a distance (referred to as a sixth distance) between the second touch electrode line 132 and the second data line 122.

For example, the fifth distance is greater than 0 μm and less than 10 μm. For example, the fifth distance is 0.5 μm, 1.2 μm, 2.0 μm, 2.5 μm, 3.2 μm, 4.0 μm, 4.5 μm, 5.0 μm, 6.0 μm, 7.0 μm, 8.0 μm, or 9.5 μm.

In some other embodiments, as shown in FIG. 6, the second touch electrode line 132 is disposed between the third sub-pixel area 113 and the another first sub-pixel area 111 adjacent thereto, and in the first direction X, a distance (referred to as a seventh distance) between the second touch electrode line 132 and the pixel electrode 140 in the third sub-pixel area 113 is approximately equal to a distance (referred to as an eighth distance) between the second touch electrode line 132 and the pixel electrode 140 in the another first sub-pixel area 111.

For example, the seventh distance is in a range from approximately 3.0 µm to approximately 6.0 µm. For example, the seventh distance is 3.0 µm, 3.5 µm, 4.0 µm, 4.5 µm, 5.0 µm, 5.5 µm, or 6.0 µm.

In some other embodiments, as shown in FIG. 7, the second touch electrode line 132 is disposed between the third sub-pixel area 113 and the second sub-pixel area 112 adjacent thereto, and in the first direction X, the distance (referred to as the seventh distance) between the second control electrode line 132 and the pixel electrode 140 in the third sub-pixel area 113 is approximately equal to a distance (referred to as a ninth distance) between the second touch electrode line 132 and the pixel electrode 140 in the second sub-pixel area 112.

For example, the seventh distance is in a range from approximately 3.0 µm to approximately 6.0 µm. For example, the seventh distance is 3.0 µm, 3.5 µm, 4.0 µm, 4.5 µm, 5.0 µm, 5.5 µm, or 6.0 µm.

For example, the ninth distance is in a range from approximately 3.0 µm to approximately 6.0 µm. For example, the ninth distance is 3.0 µm, 3.5 µm, 4.0 µm, 4.5 µm, 5.0 µm, 5.5 µm, or 6.0 µm.

In some embodiments, in the first direction X, a distance between the first data line 121 and the second data line 122 in the first signal line group 120 is approximately equal to a distance between the third data line 123 and the first touch electrode line 131 in the second signal line group 130.

In some examples, the distance between the first touch electrode line 131 and the third data line 123 in the second signal line group 130 is greater than 0 µm and less than or equal to 10 µm. Correspondingly, the distance between the first data line 121 and the second data line 122 in the first signal line group 120 is also greater than 0 µm and less than or equal to 10 µm.

In this way, it may avoid a problem that a short circuit occurs due to small distances between the first touch electrode line 131 and the third data line 123, and between the first data line 121 and the second data line 122.

For example, the distance between the first touch electrode line 131 and the third data line 123 is 5.2 µm or 4.5 µm. Correspondingly, the distance between the first data line 121 and the second data line 122 in the first signal line group 120 is 5.2 µm or 4.5 µm.

In some embodiments, the first data line 121, the second data line 122, the third data line 123, the first touch electrode line 131 and the second touch electrode line 132 are disposed in a same layer and made of a same material. For example, the material of the first data line 121, the second data line 122, the third data line 123, the first touch electrode line 131 and the second touch electrode line 132 is copper, aluminum, silver, etc., or an alloy thereof.

The description "in a same layer" means that, in the process of forming the first data line 121, the second data line 122, the third data line 123, the first touch electrode line 131 and the second touch electrode line 132, a film is formed by a film forming process such as coating, inkjet printing, or the like, and then the film is patterned by a single patterning process using a same mask to form a layer structure having specific patterns. Depending on different specific patterns, the single patterning process may include multiple exposure, development and/or etching processes, the specific patterns in the layer structure may be continuous or discontinuous, and the specific patterns may also be at different heights or have different thicknesses.

In terms of process, the first data line 121, the second data line 122, the third data line 123, the first touch electrode line 131 and the second touch electrode line 132 may be formed simultaneously, thereby simplifying the production process.

Figure 8:
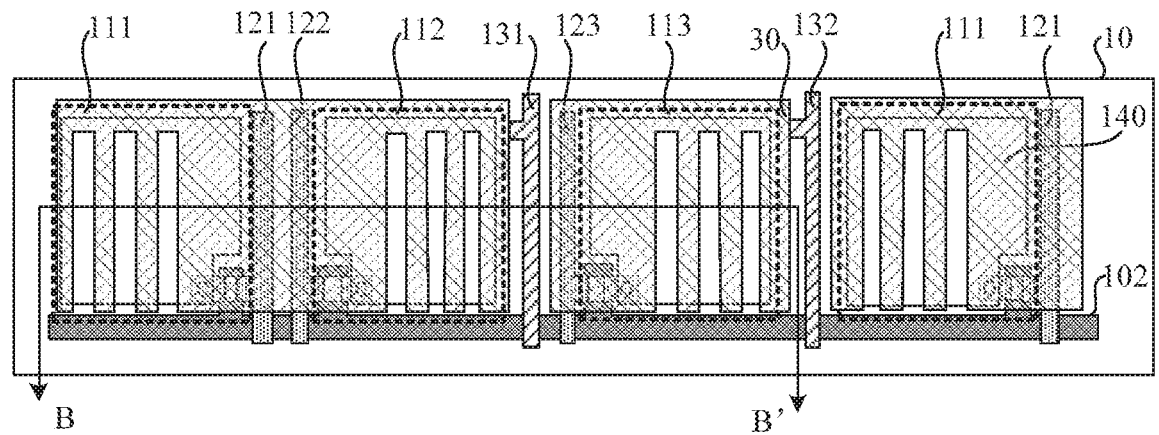
FIG. 8 is a structural diagram of yet another array substrate, in accordance with some embodiments.

In some embodiments, as shown in FIG. 8, the array substrate 1 further includes a plurality of touch electrodes 30 in the display area A on the first base 10, and the plurality of touch electrodes 30 are insulated.

As shown in FIG. 8, in a case where the array substrate 1 includes second touch electrode lines 132, each first touch electrode line 131 is electrically connected to a touch electrode 30, and each second touch electrode line 132 is electrically connected to another touch electrode 30.

At least one touch electrode of the plurality of touch electrodes 30 is disposed in at least one sub-pixel area P. For example, as shown in FIG. 8, one touch electrode 30 is disposed in a corresponding sub-pixel area P. Or, one touch electrodes 30 covers two sub-pixel areas P.

In some embodiments, the plurality of touch electrodes 30 are also multiplexed as common electrodes. On this basis, in a display period, each first touch electrode line 131 and each second touch electrode line 132 outputs respective common voltages to respective touch electrodes 30. In a touch detection period (e.g., black insertion period between rows or between frames), each first touch electrode line 131 and each second touch electrode line 132 outputs respective touch driving signals to the respective touch electrodes 30 and receives at least one touch sensing signal to detect a touch.

The touch electrodes 30 are multiplexed as common electrodes, which may reduce a thickness of the array substrate 1, and simplify the production process.

It will be noted that the first touch electrode line 131 is electrically connected to one touch electrode 30, the second touch electrode line 132 is electrically connected to another touch electrode 30, and the touch electrode 30 electrically connected to the first touch electrode line 131 is not the same as the touch electrode 30 electrically connected to the second touch electrode line 132.

For example, as shown in FIG. 8, the touch electrode 30 has a comb structure.

Figure 9:
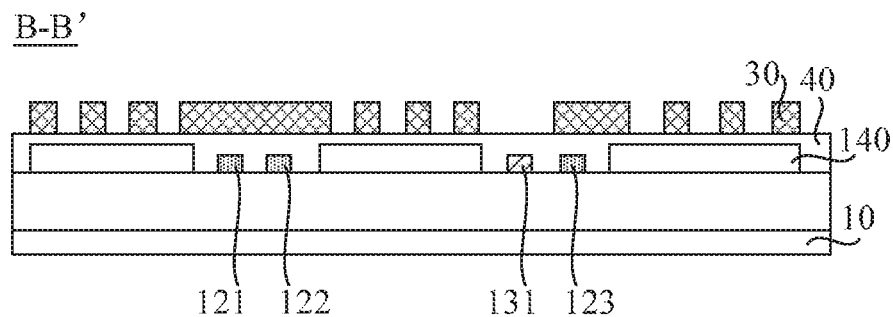
FIG. 9 is a cross-sectional diagram of the array substrate taken along the B-B' line in FIG. 8.

The pixel electrode 140 and the touch electrode 30 may be disposed in different layers. In this case, as shown in FIG. 9, the array substrate further includes an insulating layer 40 disposed between the pixel electrode 140 and the touch electrode 30.

For example, a material of the insulating layer 40 may be an inorganic material. For example, the inorganic material may include or may be silicon nitride.

For example, each first touch electrode line 131 is electrically connected to a corresponding touch electrode 30 through at least one via hole passing through the insulating layer 40. Each second touch electrode line 132 is electrically connected to a corresponding touch electrode 30 through at least one other via hole passing through the insulating layer 40.

In some embodiments, as shown in FIG. 1, the array substrate 1 further includes a plurality of thin film transistors (TFTs) in the display area A on the first base 10. Each TFT includes a gate electrode G, an active pattern, a portion of a gate insulating layer between the gate electrode G and the active pattern, a source electrode S, and a drain electrode D.

Each sub-pixel area P in the row of sub-pixel areas P is provided with at least one TFT and one pixel electrode 140. For example, each sub-pixel area P in all rows of sub-pixel areas P is provided with at least one TFT and one pixel electrode 140.

For example, the at least one TFT includes one TFT. In this case, in the first direction X, gate electrodes G of all TFTs in a same row of sub-pixel areas P may be electrically connected to a corresponding gate line 102, and a drain electrode D of each TFT may be electrically connected to a pixel electrode 140 in a sub-pixel area P where the TFT is disposed. For another example, the at least one TFT includes a plurality of TFTs. A gate electrode G of one of the plurality of TFTs is electrically connected to a corresponding gate line 102, and a drain electrode D of the one of the plurality of TFTs is electrically connected to a pixel electrode 140 in a sub-pixel area P where the plurality of TFTs are disposed. Correspondingly, a source electrode S in at least one TFT in the first sub-pixel area 111 is electrically connected to a corresponding first data line 121, a source electrode S in at least one TFT in the second sub-pixel area 112 is electrically connected to a corresponding second data line 122, and a source electrode S in at least one TFT in the third sub-pixel area 113 is electrically connected to a corresponding third data line 123.

Figure 10:
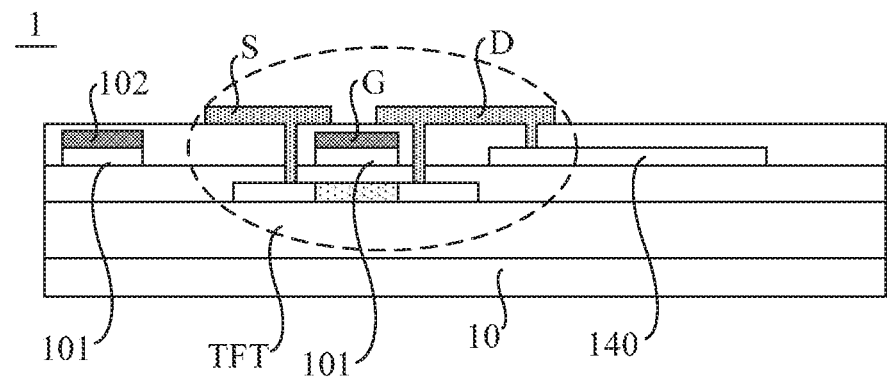
FIG. 10 is a structural diagram of yet another array substrate, in accordance with some embodiments.

In some embodiments, as shown in FIG. 10, the array substrate 1 further includes a plurality of first transparent conductive patterns 101. The plurality of first transparent conductive patterns 101 are disposed on surfaces of gate electrodes G of all the TFTs facing the first base 10 and on surfaces of all the gate lines 102 facing the first base 10, respectively. That is, each gate electrode G is provided with a first transparent conductive pattern 10, and each gate line 102 is provided with another first transparent conductive pattern 10. The plurality of first transparent conductive patterns 101 and the pixel electrode 140 are disposed in a same layer and made of a same material. For example, the material of the first transparent conductive patterns 101 is indium tin oxide (ITO).

In this case, in terms of process, all the gate lines 102, gate electrodes G of all the TFTs, all the pixel electrodes 140 and all the first transparent conductive patterns 101 may be obtained by performing a single patterning process. The patterning process may use a mask, and include a single exposure and etching process and the like, thereby simplifying the manufacturing process.

For example, referring to FIG. 10, a first transparent conductive film is formed on the first base 10 and a first metal film is formed on the first transparent conductive film. Then the first transparent conductive film and the first metal film are performed a single exposure by using a mask, and then are developed. Afterwards, the first metal film except positions where the gate electrodes G and the gate lines 102 are to be formed is removed, and the first transparent conductive film except portions on which the gate electrode G, the gate line 102 and the pixel electrode 140 are to be formed is removed, so that the gate electrodes G, the gate lines 102, the pixel electrodes 140 and the first transparent conductive patterns 101 are formed.

Figure 11:
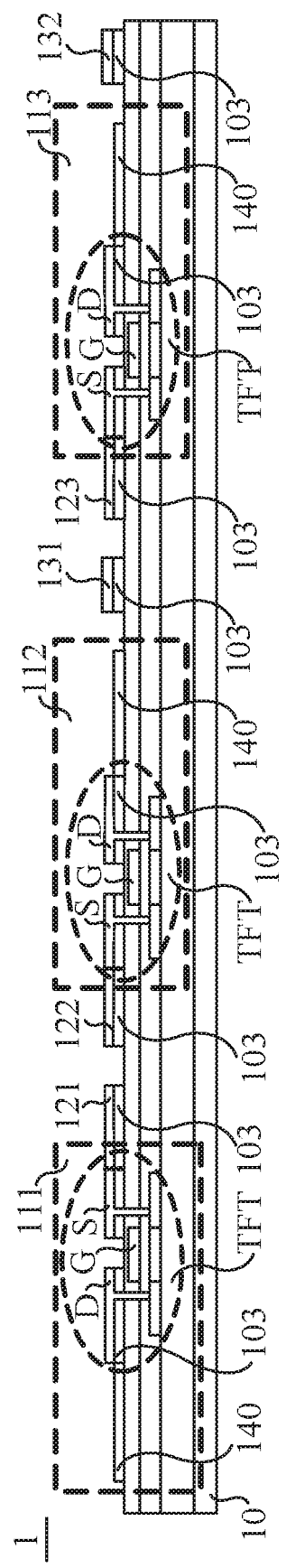
FIG. 11 is a structural diagram of yet another array substrate, in accordance with some embodiments.

In some other embodiments, as shown in FIG. 11, the array substrate 1 further includes a plurality of second transparent conductive patterns 103. The plurality of second transparent conductive patterns 103 are disposed on surfaces of source electrodes S and drain electrodes D of all the TFTs facing the first base 10, and on surfaces of all the first data lines 121, all the second data lines 122, and all the third data lines 123 facing the first base 10, respectively. That is, each source electrode S is provided with a second transparent conductive pattern 103, each drain electrode D is provided with another second transparent conductive pattern 103, each first data line 121 is provided with yet another second transparent conductive pattern 103, each second data line 122 is provided with yet another second transparent conductive pattern 103, and each third data line 123 is provided with yet another second transparent conductive pattern 103.

The plurality of second transparent conductive patterns 103 and the pixel electrodes 140 are disposed in a same layer and made of a same material. For example, the material of the second transparent conductive pattern 103 is ITO.

In this case, in terms of process, the source electrodes S and the drain electrodes D of all the TFTs, all the first data lines 121, all the second data lines 122, all the third data lines 123, all the second transparent conductive patterns 103 and all the pixel electrodes 140 may be obtained by performing a single patterning process. The patterning process may use a mask, and include a single exposure and etching process and the like, thereby simplifying the manufacturing process.

For example, referring to FIG. 11, a second transparent conductive film is formed on the first base 10 and a second metal film is formed on the second transparent conductive film. Then, the second transparent conductive film and the second metal film are performed a single exposure by using a mask and are developed. Afterwards, the second metal film except positions where the source electrodes 5, the drain electrodes D, the first data lines 121, the second data lines 122 and the third data lines 123 are to be formed is removed, and the second transparent conductive film except positions on which the source electrodes S, the drain electrodes D, the first data lines 121, the second data lines 122, the third data lines 123 and the pixel electrodes 140 are to be formed is removed, so that the source electrodes 5, the drain electrodes D, the first data lines 121, the second data lines 122, the third data lines 123, the pixel electrodes 140 and the second transparent conductive patterns 103 are formed.

In a case where the first touch electrode line 131, the second touch electrode lines 132, the first data line 121, the second data line 122 and the third data line 123 are disposed in a same layer and made of a same material, as shown in FIG. 11, the plurality of second transparent conductive patterns 103 are also provided on surfaces of all the first touch electrode lines 131 facing the first base 10, and on surfaces of all the second touch electrode lines 132 facing the first base 10.

In this case, in terms of process, all the pixel electrodes 140, the source electrodes S and the drain electrodes D of all the TFTs, all the first data lines 121, all the second data lines 122, all the third data lines 123, all the first touch electrode lines 131 and all the second touch electrode lines 132 may be formed through a single exposure by using a mask, and at least one etching process and the like, thereby simplifying the process. In this case, there exist second transparent conductive patterns 103 on surfaces of the source electrodes S and the drain electrodes D of all the TFTs facing the first base 10, and on surfaces of all the first data lines 121, all the second data lines 122, all the third data lines 123, all the first touch electrode lines 131 and all the second touch electrode lines 132 facing the first base 10, respectively.

As shown in FIGS. 1 and 3, since the first data line 121 and the second data line 122 in the first data line group 120 are disposed between the first sub-pixel area 111 and the second sub-pixel area 112, the position of the at least one TFT in the first sub-pixel area 111 relative to the first data line 121 electrically connected thereto is different from the position of the at least one TFT in the second sub-pixel area 112 relative to the second data line 122 electrically connected there to. As shown in FIG. 1, in a case where the third data line 123 in the second data line group 130 is disposed between the second sub-pixel area 112 and the third sub-pixel area 113, the position of the at least one TFT in the third sub-pixel area 113 relative to the third data line 123 is different from the position of the at least one TFT in the another first sub-pixel area 111 relative to another first data line 121; the position of the at least one TFT in the third sub-pixel area 113 relative to the third data line 123 is the same as the position of the at least one TFT in the second sub-pixel area 112 relative to the second data line 122. As shown in FIG. 3, in a case where the third data line 123 in the second data line group 130 is disposed between the third sub-pixel area 113 and the another first sub-pixel area 111 adjacent thereto, the position of the at least one TFT in the third sub-pixel area 113 relative to the third data line 123 is different from the position of the at least one TFT in the second sub-pixel area 112 relative to the second data line 122; the position of the at least one TFT in the third sub-pixel area 113 relative to the third data line 123 is the same as the position of the at least one TFT in the another first sub-pixel area 111 relative to the another first data line 111 electrically connected thereto.

For example, as shown in FIG. 1, the third data line 123 in the second data line group 130 is disposed between the second sub-pixel area 112 and the third sub-pixel area 113 adjacent thereto. In this case, the at least one TFT in the third sub-pixel area 113 and the at least one TFT in the second sub-pixel area 112 are disposed at the right sides of the third data line 123 and the second data line 122 to which they are respectively electrically connected; the at least one TFT in the first sub-pixel area 111 is disposed at the left side of the first data line 121 to which it is electrically connected.

As shown in FIG. 3, the third data line 123 in the second data line group 130 is disposed between the third sub-pixel area 113 and the another first sub-pixel area 111 adjacent thereto. In this case, the at least one TFT in the third sub-pixel area 113 and the at least one TFT in the another first sub-pixel area 111 are disposed at the left sides of the third data line 123 and the another first data line 121 to which they are respectively electrically connected, respectively; the at least one TFT in the second sub-pixel area 112 is disposed at the right side of the second data line 122 to which it is electrically connected.

In some embodiments, as shown in FIG. 2, the display panel further includes an opposite substrate 2. In some examples, the opposite substrate 2 includes a second base 20 and a color film layer 200 disposed on a side of the second base 20 proximate to the array substrate 1. In this case, the opposite substrate 2 may be a color filter substrate.

The color film layer 200 includes first filter units 201, second filter units 202 and third filter units 203.

The first sub-pixel area 111 corresponds to one first filter unit 201, the second sub-pixel area 112 corresponds to one second filter unit 202, and the third sub-pixel area 113 corresponds to one third filter unit 203. For example, as shown in FIG. 2, an orthographic projection of the first sub-pixel area 111 on the first base 10 and an orthographic projection of the first filter unit 201 on the first base 10 overlap, an orthographic projection of the second sub-pixel area 112 on the first base 10 and an orthographic projection of second filter unit 202 on the first base 10 overlap, and an orthographic projection of the third sub-pixel area 113 on the first base 10 and an orthographic projection of the third filter unit 203 on the first base 10 overlap.

For example, the display panel is a liquid crystal display panel, and as shown in FIG. 2, the display panel further includes a liquid crystal layer 3 disposed between the opposite substrate 2 and the array substrate 1.

On this basis, the sub-pixel of the first color includes: at least one TFT and the pixel electrode 140 that are disposed in the first sub-pixel area 111, the first filter unit 201 corresponding to the first sub-pixel area 111, and a portion of the liquid crystal layer 3 between the first sub-pixel area 111 and the first filter unit 201. The sub-pixel of the second color includes: at least one TFT and the pixel electrode 140 that are disposed in the second sub-pixel area 112, the second filter unit 202 corresponding to the second sub-pixel area 112, and a portion of the liquid crystal layer 3 between the second sub-pixel area 112 and the second filter unit 202. The sub-pixel of the third color includes: at least one TFT and the pixel electrode 140 that are disposed in the third sub-pixel area 113, the third filter unit 203 corresponding to the third sub-pixel area 113, and a portion of the liquid crystal layer 3 between the third sub-pixel area 113 and the third filter unit 203.

In some embodiments, the display device further includes a backlight module disposed at a side of the array substrate 1 away from the opposite substrate 2, and the backlight module is used for supplying backlight for the display panel. An electric field acting on liquid crystal molecules in the liquid crystal layer 3 corresponding to a sub-pixel area P is controlled by a voltage applied to the pixel electrode in the sub-pixel area P through the data line, so that a deflection degree of the liquid crystal molecules is controlled. In this way, regions of the liquid crystal layer 3 corresponding to different sub-pixel areas P may have different transmittance, thereby realizing the display of different gray scales.

For example, a display mode of the liquid crystal display panel is a fringe field switching (FFS) mode.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. An array substrate having a display area including a plurality of sub-pixel areas, the array substrate comprising:
    a first base;
    first data lines, second data lines, third data liens and first touch electrode lines, all of which are disposed in the display area on the first base, and extend in a second direction, wherein
    the first data lines, the second data lines, the third data lines and the first touch electrode lines are divided into a plurality of line groups, each line group includes a first signal line group disposed between first two adjacent sub-pixel areas, and a second signal line group disposed between second two adjacent sub-pixel areas, and the first two adjacent sub-pixel areas and the second two adjacent sub-pixel areas include three sub-pixel areas adjacent in a first direction intersecting the second direction;
    the first signal line group includes a first data line and a second data line that are spaced, and the second signal line group includes a third data line and a first touch electrode line that are spaced; and
    each of the first data line, the second data line and the third data line in the line group is closer to a respective one of the three sub-pixel areas relative to other three lines in the line group.

2. The array substrate according to claim 1, wherein a row of sub-pixel areas arranged in the first direction includes first sub-pixel areas, second sub-pixel areas and third sub-pixel areas, and the first sub-pixel areas, the second sub-pixel areas and the third sub-pixel areas are arranged periodically; and the first two adjacent sub-pixel areas include a first sub-pixel area and a second sub-pixel area, the second two adjacent sub-pixel areas include the second sub-pixel area and a third sub-pixel area, and the third data line is disposed at a side of the first touch electrode line proximate to the third sub-pixel area.

3. The array substrate according to claim 2, further comprising a pixel electrode disposed in each sub-pixel area in the row of sub-pixel areas on the first base, wherein the first data line is closer to the first sub-pixel area than the second data line; in the first direction, a first distance between the first data line and a pixel electrode in the first sub-pixel area, a second distance between the second data line and a pixel electrode in the second sub-pixel area, and a third distance between the third data line and a pixel electrode in the third sub-pixel area are approximately equal.

4. The array substrate according to claim 3, wherein the second signal line group is disposed between the second sub-pixel area and the third sub-pixel area, a distance between the first touch electrode line and the pixel electrode in the second sub-pixel area in the first direction is a fourth distance, and the fourth distance is greater than or equal to the third distance.

5. The array substrate according to claim 4, wherein the third distance is in a range from approximately 3.0 μm to approximately 6.0 μm; and the fourth distance is in a range from approximately 3.0 μm to approximately 6.0 μm.

6. The array substrate according to claim 3, wherein the second signal line group is disposed between the third sub-pixel area and the another first sub-pixel area, a distance between the first touch electrode line and a pixel electrode in the another first sub-pixel area in the first direction is a fourth distance, and the fourth distance is greater than or equal to the third distance.

7. The array substrate according to claim 2, further comprising second touch electrode lines that are disposed in the display area on the first base and extend in the second direction, wherein each second touch electrode line and a corresponding second signal line group are disposed at opposite sides of a third sub-pixel area.

8. The array substrate according to claim 7, further comprising a pixel electrode disposed in each sub-pixel area in the row of sub-pixel areas on the first base, wherein the second touch electrode line is disposed between the third sub-pixel area and the another first sub-pixel area, and in the first direction, a seventh distance between the second touch electrode line and the pixel electrode in the third sub-pixel area is approximately equal to an eighth distance between the second touch electrode line and the pixel electrode in the another first sub-pixel area.

9. The array substrate according to claim 8, wherein the distance between the third data line and the first touch electrode line in the second signal line group is greater than 0 μm, and less than or equal to 10 μm; and in a case where the second touch electrode line is disposed between the third sub-pixel area and the another first sub-pixel area, the seventh distance is in a range from approximately 3.0 μm to approximately 6.0 μm.

10. The array substrate according to claim 7, wherein the first data line, the second data line, the third data line, the first touch electrode line and the second touch electrode line are all disposed in a same layer and made of a same material.

11. The array substrate according to claim 10, further comprising a plurality of thin film transistors and a plurality of pixel electrodes, which are disposed in the display area on the first base, wherein each sub-pixel area in the row of sub-pixel areas is provided with at least one thin film transistor and one pixel electrode;

a gate electrode in the at least one thin film transistor is electrically connected to a corresponding gate line, and a drain electrode in the at least one thin film transistor is electrically connected to the pixel electrode; and a source electrode in at least one thin film transistor in the first sub-pixel area is electrically connected to a corresponding first data line, a source electrode in at least one thin film transistor in the second sub-pixel area is electrically connected to a corresponding second data line, and a source electrode in at least one thin film transistor in the third sub-pixel area is electrically connected to a corresponding third data line.

12. The array substrate according to claim 11, further comprising a plurality of first transparent conductive patterns, wherein the plurality of first transparent conductive patterns are disposed on surfaces of gate electrodes of all thin film transistors facing the first base, and on surfaces of all gate lines facing the first base, respectively, and the plurality of first transparent conductive retention patterns and the plurality of pixel electrodes are disposed in a same layer and made of a same material.

13. The array substrate according to claim 11, further comprising a plurality of second transparent conductive patterns, wherein the plurality of second transparent conductive retention patterns are disposed on surfaces of source electrodes and drain electrodes of all thin film transistors facing the first base, and on surfaces of all first data lines, all second data lines and all third data lines facing the first base, respectively, and the plurality of second transparent conductive patterns and the plurality of pixel electrodes are disposed in a same layer and made of a same material.

14. The array substrate according to claim 1, wherein in the first direction, a distance between the first data line and the second data line in the first signal line group is approximately equal to a distance between the third data line and the first touch electrode line in the second signal line group.

15. A display panel, comprising;
the array substrate according to claim 1;
an opposite substrate, and
a liquid crystal layer disposed between the array substrate and the opposite substrate.

16. The display panel according to claim 15, wherein in the array substrate, a row of sub-pixel areas arranged in the first direction includes first sub-pixel areas, second sub-pixel areas and third sub-pixel areas, and the first sub-pixel areas, the second sub-pixel areas and the third sub-pixel areas are arranged periodically;

the opposite substrate includes a second base and a color film layer disposed at a side of the second base proximate to the array substrate, and the color film layer includes first filter units, second filter units and third filter units; and each first sub-pixel area corresponds to one first filter unit, each second sub-pixel area corresponds to one second filter unit, and each third sub-pixel area corresponds to one third filter unit.

17. The array substrate according to claim 1, wherein a row of sub-pixel areas arranged in the first direction includes first sub-pixel areas, second sub-pixel areas and third sub-pixel areas, and the first sub-pixel areas, the second sub-pixel areas and the third sub-pixel areas are arranged periodically; and
the first two adjacent sub-pixel areas include the first sub-pixel area and the second sub-pixel area, the second two adjacent sub-pixel areas includes the third sub-pixel area and another first sub-pixel area, and the third data line is disposed at a side of the first touch electrode line proximate to the third sub-pixel area.

18. The array substrate according to claim 17, further comprising second touch electrode lines that are disposed in the display area on the first base and extend in the second direction, wherein
each second touch electrode line is disposed between a first data line and a second data line in a corresponding first signal line group.

19. The array substrate according to claim 18, further comprising a pixel electrode disposed in each sub-pixel area in the row of sub-pixel areas on the first base, wherein the second touch electrode line is disposed between the first data line and the second data line in the corresponding first signal line group, and in the first direction, a fifth distance between the second touch electrode line and the first data line is approximately equal to a sixth distance between the second touch electrode line and the second data line;
or,
the second touch electrode line is disposed between the third sub-pixel area and the second sub-pixel area, and in the first direction, the seventh distance between the second touch electrode line and the pixel electrode in the third sub-pixel area is approximately equal to a ninth distance between the second touch electrode line and the pixel electrode in the second sub-pixel area.

20. The array substrate according to claim 19, wherein the distance between the third data line and the first touch electrode line in the second signal line group is greater than 0 µm, and less than or equal to 10 µm; and
in a case where the second touch electrode line is disposed between the first data line and the second data line in the corresponding first signal line group, the fifth distance is greater than 0 µm, and less than or equal to 10 µm; or
in a case where the second touch electrode line is disposed between the third sub-pixel area and the second sub-pixel area, the seventh distance is in a range from approximately 3.0 µm to approximately 6.0 µm.

* * * * *